(12) United States Patent
Weis

(10) Patent No.: US 7,963,276 B2
(45) Date of Patent: Jun. 21, 2011

(54) COMBINATION VALVE

(75) Inventor: Christian Weis, Budenheim (DE)

(73) Assignee: Continental Automotive GmbH, Hannover (DE)

( * ) Notice: Subject to any disclaimer, the term of this patent is extended or adjusted under 35 U.S.C. 154(b) by 141 days.

(21) Appl. No.: 12/525,204

(22) PCT Filed: Jan. 15, 2008

(86) PCT No.: PCT/EP2008/050398
§ 371 (c)(1),
(2), (4) Date: Jul. 30, 2009

(87) PCT Pub. No.: WO2008/092739
PCT Pub. Date: Aug. 7, 2008

(65) Prior Publication Data
US 2010/0116256 A1    May 13, 2010

(30) Foreign Application Priority Data

Feb. 2, 2007    (DE) .......................... 10 2007 005 363

(51) Int. Cl.
*F02B 47/08* (2006.01)
*F02M 25/07* (2006.01)
(52) U.S. Cl. ............................... 123/568.23; 137/625.47
(58) Field of Classification Search ............. 123/568.23, 123/568.24; 137/625.47
See application file for complete search history.

(56) References Cited

U.S. PATENT DOCUMENTS

| 5,584,322 | A | 12/1996 | Degenhardt et al. |
| 5,811,898 | A * | 9/1998 | Everingham ................... 310/36 |
| 6,840,502 | B2 | 1/2005 | Benra et al. |
| 7,690,397 | B2 * | 4/2010 | Hollis ....................... 137/625.47 |
| 2007/0261745 | A1 * | 11/2007 | Hollis ....................... 137/625.47 |

FOREIGN PATENT DOCUMENTS

| DE | 3420474 A1 | 12/1985 |
| DE | 4318203 C1 | 9/1994 |
| EP | 0048680 A1 | 3/1982 |
| EP | 1335158 B1 | 8/2005 |
| GB | 1191651 A | 5/1970 |

* cited by examiner

*Primary Examiner* — Erick Solis
(74) *Attorney, Agent, or Firm* — Cohen Pontani Lieberman & Pavane LLP

(57) ABSTRACT

The combination valve comprises a tubular center part, a gas inlet which is arranged on the outer shell of the tubular center part, a gas outlet A which is arranged adjacent to the gas inlet on the outer shell of the tubular center part, a first branch which is arranged opposite the gas outlet on the outer shell of the tubular center part, and a second branch which is arranged opposite the gas inlet on the outer shell of the tubular center part. The first branch is connected to the second branch via a cooler. A rotary slide is mounted centrally in the tubular center part such that it can rotate about the longitudinal axis of the tubular centre part. Depending on the operating state, the rotary slide shuts off at least partially the gas inlet, the gas outlet, the first branch and the second branch.

6 Claims, 3 Drawing Sheets

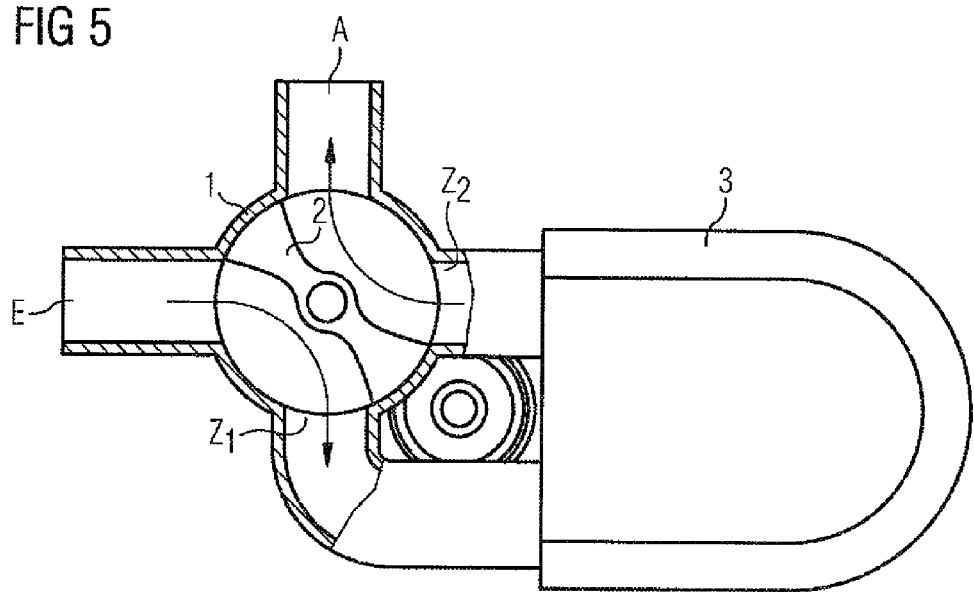
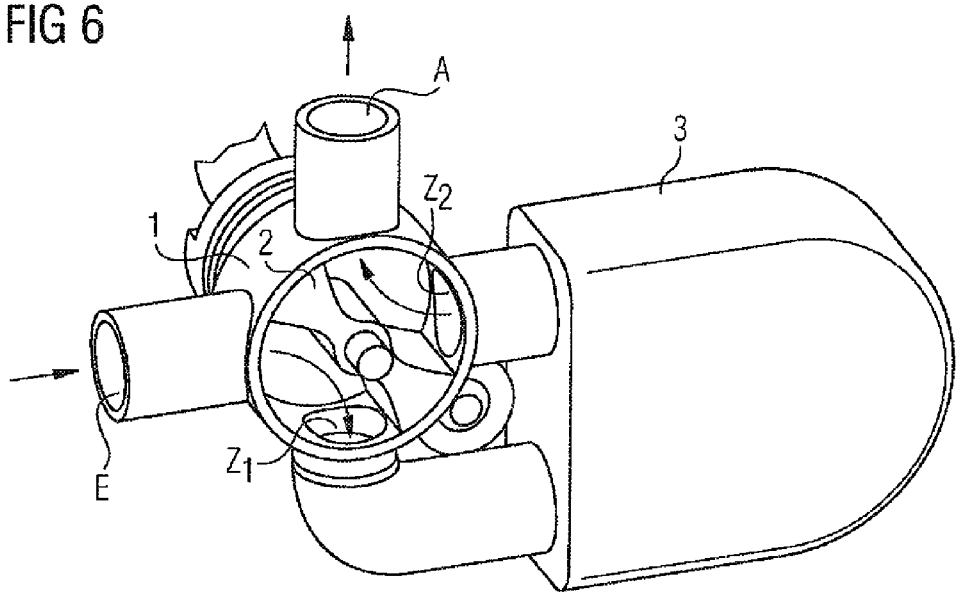

COMBINATION VALVE

PRIORITY CLAIM

This is a U.S. national stage of application No. PCT/EP2008/050398, filed on 15 Jan. 2008, which claims Priority to the German Application No.: 10 2007 005 363.2, filed: 2 Feb. 2007, the contents of both being incorporated herein by reference.

BACKGROUND OF THE INVENTION

1. Field of the Invention

The invention relates to a combination valve. Furthermore, the invention relates to the use of the combination valve. Specifically, the invention relates to an exhaust-gas recirculation valve in motor vehicles.

2. Prior Art

Valves for gases are known. EP 1 335 158 B1 describes a flap valve for fuel assemblies. The flap valve has a gas inlet and two gas outlets. Each gas outlet can be closed with a valve flap, both valve flaps being arranged perpendicularly with respect to one another. It is possible as a result to guide the entire quantity of gas either through one gas outlet or through the other gas outlet. As a rule, two gas outlets are provided to optionally cool the gas behind the respective gas outlet or to forward it uncooled. The respective switchover then takes place via the valve flaps which are jointly mounted rotatably on a shaft. It is disadvantageous in flap valves of this type that only two settings, which are independent of the gas quantity, can be performed. The entire gas quantity is either cooled behind the respective gas outlet or the entire gas quantity is forwarded uncooled behind the respective gas outlet of the flap valve. Additional regulation of the gas quantity at the respective setting is not possible by way of the flap valves according to the prior art. If the gas quantity has to be additionally regulated according to the operating state, it is necessary to provide in each case shut-off elements in front of or behind the two gas outlets of the flap valve, which shut-off elements can therefore perform a quantitative regulation. The high structural outlay is very disadvantageous here.

DE 34 20 474 A1 has discloses a combination valve having a cylindrical hole and a rotary slide, while GB 1,191,651 discloses a combination valve for a heating system, which combination valve guides a part flow of a heating liquid through a radiator in a regulated manner.

SUMMARY OF THE INVENTION

One embodiment of the invention is based on providing an exhaust-gas recirculation valve, by way of which it is possible also to perform a quantitative regulation at the same time in addition to the setting of the positions "cooled" or "uncooled". The exhaust-gas recirculation valve is of space saving design.

A complete shut-off is possible by a rotary slide. It has been shown in a surprising way that not only guiding of the exhaust gas uncooled or cooled through the radiator is set by the arrangement and action of the rotary slide, but that it is also possible to set the quantity of gas which is guided through the exhaust-gas recirculation valve. The arrangement of a plurality of valve flaps is advantageously be dispensed with, with the result that the arrangement of the combination valve makes only a relatively small amount of installation space necessary. The decision as to whether the gas is forwarded cooled or uncooled in the process is combined in the combination valve with a continuous quantitative regulation of the gas, with the result that additional shut-off elements do not have to be provided for a quantitative regulation of the gas.

An object on which the invention is based is achieved by a combination valve which has a tubular center part, a gas inlet E which is arranged on the outer shell of the tubular center part, a gas outlet A which is arranged on the outer shell of the tubular center part adjacently to the gas inlet E, a first branch Z1 which is arranged on the outer shell of the tubular center part such that it lies opposite the gas outlet A, a second branch Z2 which is arranged on the outer shell of the tubular center part such that it lies opposite the gas inlet E, the first branch Z1 and the second branch Z2 being connected to one another via a radiator, in which a rotary slide is mounted centrally in the tubular center part such that it can be rotated about the longitudinal axis of the tubular center part, which rotary slide can be guided sealingly, at its two outer boundaries as viewed in the longitudinal direction, on the inner wall of the tubular center part and, depending on the operating state, shuts off the gas inlet E, the gas outlet A, the first branch Z1 and the second branch Z2 at least partially for the passage of gas. A complete shut-off is therefore possible by way of the rotary slide. It has been shown that not only guiding of the exhaust gas uncooled or cooled through the radiator can be set by the arrangement and action of the rotary slide, but that it is also possible to set the quantity of gas which is guided through the combination valve. Here, the arrangement of a plurality of valve flaps can advantageously be dispensed with, with the result that the arrangement of the combination valve makes only a relatively small amount of installation space necessary. The decision as to whether the gas is forwarded cooled or uncooled in the process is advantageously combined in the combination valve with a continuous quantitative regulation of the gas, with the result that additional shut-off elements do not have to be provided for a quantitative regulation of the gas.

One preferred embodiment of the invention comprises a gas inlet E and a gas outlet A firstly and a first branch Z1 and a second branch Z2 secondly arranged in each case perpendicularly with respect to one another. Longitudinal axes of the gas inlet E, the gas outlet A, the first branch Z1 and the second branch Z2 have a common point of intersection. The combination valve can be of particularly compact construction, it being possible for a simple rotary slide to be used at the same time, the production of which can take place structurally relatively without problems.

In motor vehicles, only a relatively small amount of installation space is available for the exhaust-gas recirculation, with the result that the use of the exhaust-gas recirculation valve in motor vehicles is particularly advantageous.

According to one embodiment of the invention, a water radiator is arranged as the radiator. The gas which is then to be cooled can be cooled particularly rapidly and effectively, which has a particularly advantageous effect on the reduction of the required installation space for the combination valve.

BRIEF DESCRIPTION OF THE DRAWINGS

In the following text, the subject matter of the invention will be explained in greater detail and by way of example using the drawing (FIG. 1 to FIG. 6), in which:

FIG. 2 is the combination valve in partial cross section, with a small quantity of uncooled exhaust gas passing through;

FIG. 3 is the combination valve in partial cross section, with the complete quantity of uncooled exhaust gas passing through;

FIG. 4 is the combination valve in partial cross section, with a small quantity of cooled exhaust gas passing through;

FIG. 5 is the combination valve in cross section, while the complete quantity of cooled exhaust gas passes through; and FIG. 6 is the combination valve in a perspective view with a view of the rotary slide in a position according to FIG. 5.

DETAILED DESCRIPTION OF THE DRAWINGS

Figure 1:
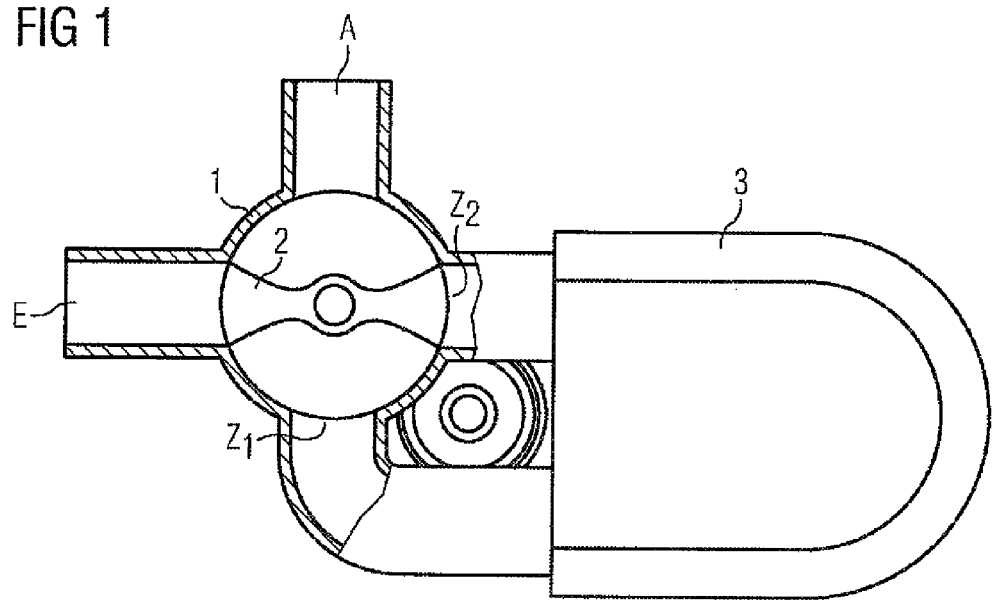
FIG. 1 is a combination valve in partial cross section, in a shut-off state.

FIG. 1 is a combination valve in partial cross section, in the shut-off state. The gas is exhaust gas of a motor vehicle. The combination valve comprises a tubular center part 1, a gas inlet E which is arranged on the outer casing of the tubular center part 1, a gas outlet A which is arranged on the outer shell of the tubular center part 1 adjacent to the gas inlet E, a first branch Z1 which is arranged on the outer shell of the tubular center part 1 such that it lies opposite the gas outlet A, and a second branch Z2 which is arranged on the outer shell of the tubular center part 1 such that it lies opposite the gas inlet E. The first branch Z1 and the second branch Z2 are connected to one another via a radiator 3. Radiator 3 is preferably a water radiator. Furthermore, the combination valve has a rotary slide 2 mounted centrally in the tubular center part 1 such that it is rotatable about a longitudinal axis of the tubular center part 1. At its two outer boundaries as viewed in the longitudinal direction, the rotary slide 2 is guided slidingly on the inner wall of the tubular center part 1. Depending on the operating state, the rotary slide 2 can shut off the gas inlet E, the gas outlet A, the first branch Z1 and the second branch Z2 at least partially for the passage of gas. The gas inlet E and the gas outlet A firstly and the first branch Z1 and the second branch Z2 secondly are arranged in each case perpendicularly with respect to one another, their longitudinal axes having a common point of intersection. In the closed state which is shown in FIG. 1, the rotary slide 2 shuts off the gas inlet E, with the result that no exhaust gas is guided through the combination valve. If a small quantity of exhaust gas is to be guided uncooled through the combination valve, it is necessary to rotate the rotary slide 2 slightly in the counterclockwise direction. Here, the rotary slide 2 is rotated in the counterclockwise direction until the desired quantity of exhaust gas is guided through the combination valve.

Figure 2:
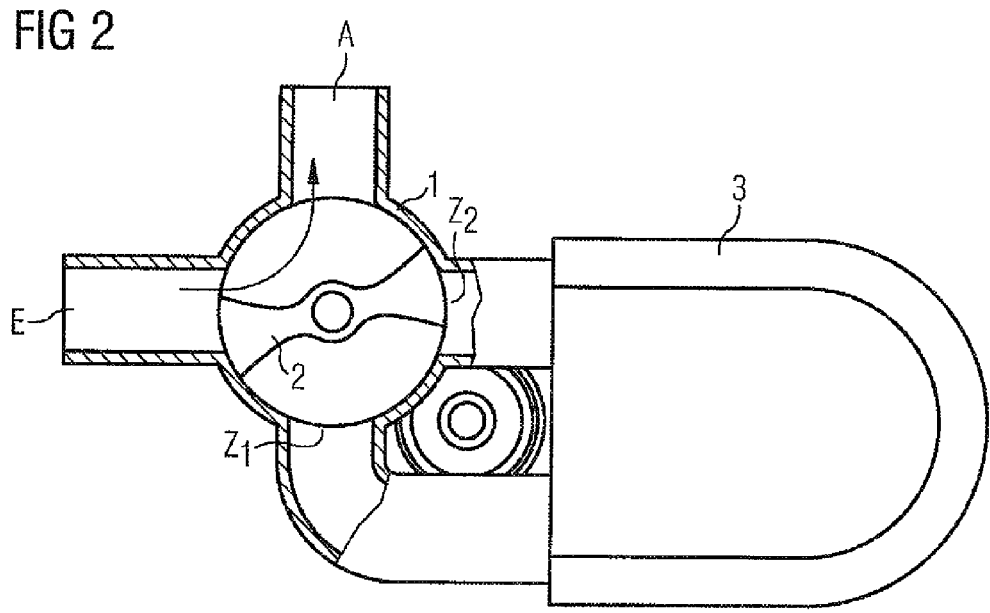

FIG. 2 depicts the combination valve partially in cross section, for that case where a relatively small quantity of exhaust gas is to be guided uncooled in the arrow direction through the combination valve. As a result of a slight rotation of the rotary slide 2 in the counterclockwise direction, the rotary slide 2 opens part of the gas inlet E, with the result that a small quantity of exhaust gas can pass through the combination valve to the gas outlet A. The radiator 3 is not loaded with exhaust gas.

Figure 3:
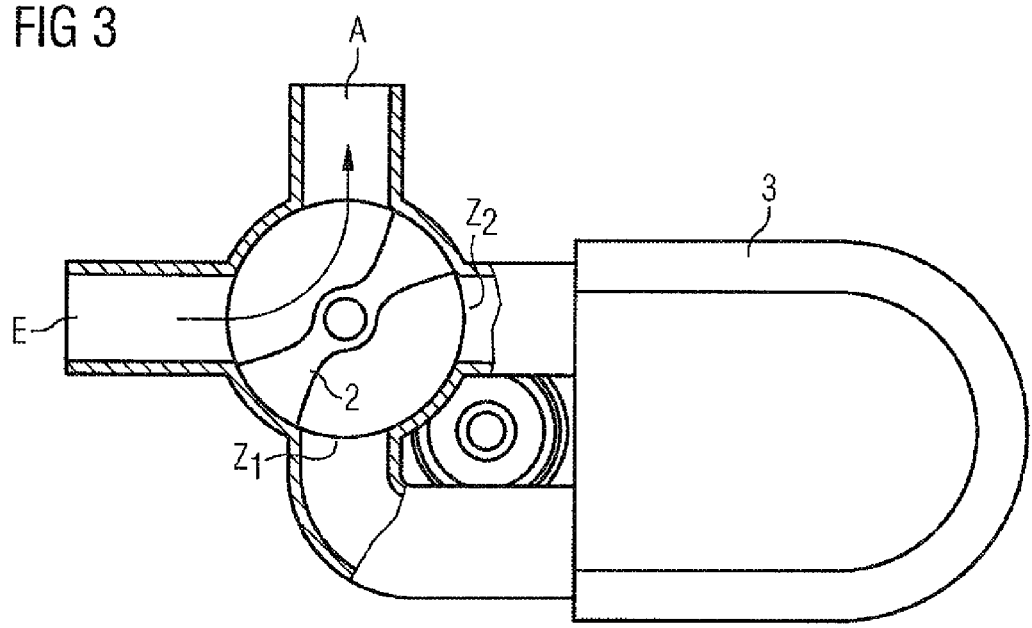

FIG. 3 depicts the combination valve partially in cross section, in the position in which the entire quantity of exhaust gas is guided uncooled in the arrow direction through the combination valve. In order to achieve this position starting from the state which is shown in FIG. 2, the rotary slide 2 is rotated further in the counterclockwise direction.

Figure 4:
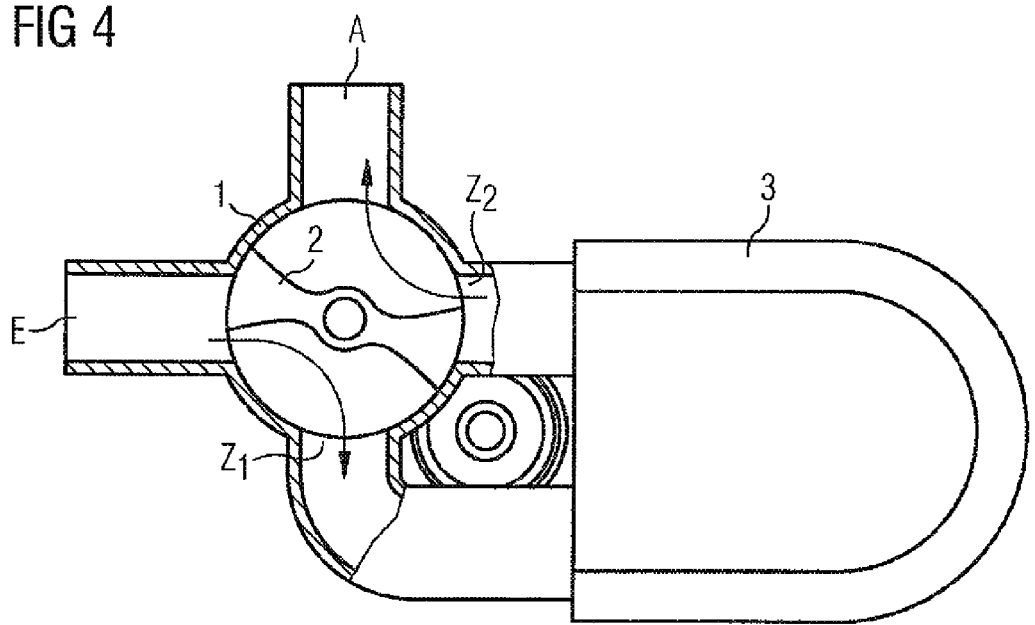

FIG. 4 depicts the combination valve partially in cross section, for that state that a part of the exhaust gas is guided cooled in the arrow direction through the combination valve. Proceeding from the state which is shown in FIG. 1, the rotary slide 2 is rotated somewhat in the clockwise direction. As a result, a part of the gas inlet E is opened and at the same time a part of the second branch Z2 is released, with the result that a small part of the exhaust gas is fed via the first branch Z1, via the radiator 3 and via the second branch Z2 to the gas outlet A.

FIG. 5 depicts the combination valve partially in cross section, for that state that the entire quantity of exhaust gas is guided cooled through the combination valve. In order to achieve this, starting from the position which is shown in FIG. 4, it is required to rotate the rotary slide 2 further in the clockwise direction.

FIG. 6 depicts the combination valve three-dimensionally with a view of the rotary slide 2, in the state which is shown in FIG. 5. The combination valve generally requires only a small amount of installation space and combines the possibility of gas cooling with simultaneous quantity regulation of the gas in a particularly advantageous way, said combination valve being particularly suitable as exhaust-gas recirculation valve in motor vehicles.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An exhaust-gas recirculation valve configured for forwarding a gas in a cooled or uncooled state, the exhaust-gas recirculation valve comprising:
   a tubular center part having an outer shell;
   a gas inlet arranged on the outer shell of the tubular center part;
   a gas outlet arranged on the outer shell of the tubular center part adjacent to the gas inlet;
   a first branch arranged on the outer shell of the tubular center part opposite the gas outlet;
   a second branch arranged on the outer shell of the tubular center part opposite the gas inlet;
   a radiator connecting the first branch and the second branch; and
   a rotary slide rotatabley mounted centrally in the tubular center part such that it sealingly contacts an inner surface of the tubular center part at two points on opposite sides of the longitudinal axis and rotateable about a longitudinal axis of the tubular center part,
   wherein the rotary slide is rotatable to create a plurality of operating states comprising:
      closing the gas inlet;
      passing the exhaust-gas stream in a continuous quantity-regulated manner from the inlet to the outlet; and
      passing the exhaust-gas stream in a continuous quantity-regulated manner from the gas inlet to the gas outlet via the first branch, the radiator, and the second branch.

2. The exhaust-gas recirculation valve according to claim 1, wherein
   the gas inlet and the gas outlet are arranged perpendicular to each other,
   the first branch and the second branch are arranged perpendicular to each other, and respective longitudinal axes of the gas inlet, the gas outlet, the first branch, and the second branch having a common point of intersection.

3. The exhaust-gas recirculation valve according to claim 1 wherein the radiator is a water radiator.

4. The exhaust-gas recirculation valve according to claim 1 wherein the exhaust-gas recirculation valve is configured to recirculate exhaust gas in a motor vehicle.

5. The exhaust-gas recirculation valve according to claim 2, wherein the common point of intersection corresponds to the longitudinal axis of the tubular center part.

6. The exhaust-gas recirculation valve according to claim 2 wherein the radiator is a water radiator.

* * * * *